United States Patent Office 3,490,754
Patented Jan. 20, 1970

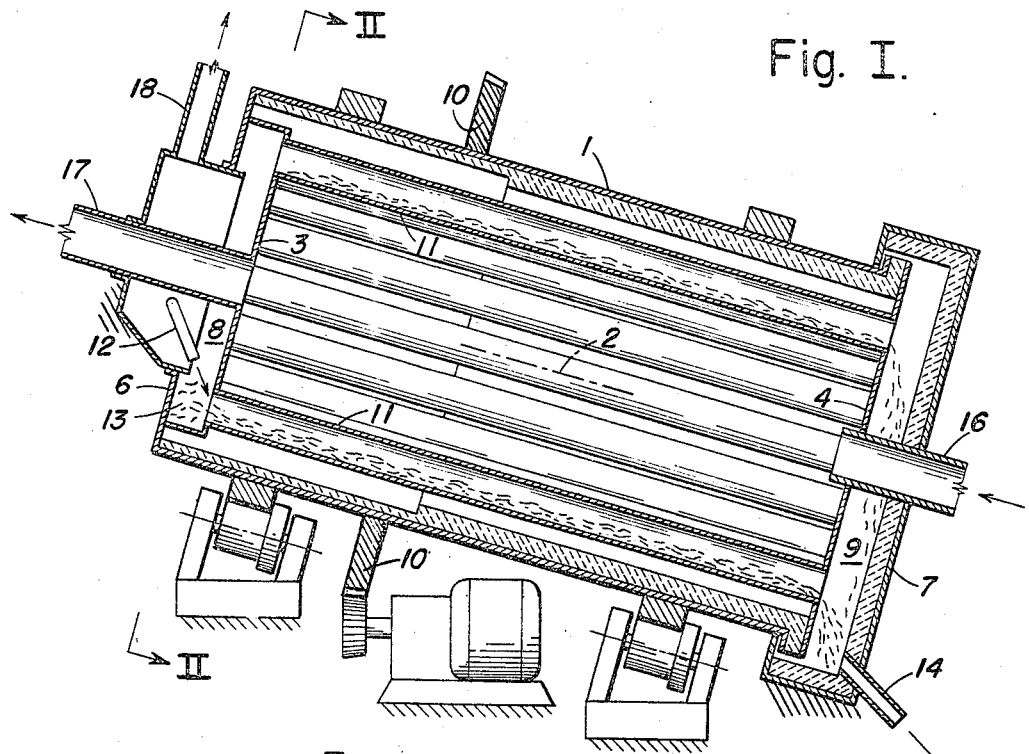
Fig. I.
Fig. II.
INVENTOR.
William V. Bauer
ATTORNEY

3,490,754
ROTARY KILN
William V. Bauer, New York, N.Y., assignor to The Lummus Company, New York, N.Y., a corporation of Delaware
Filed Feb. 8, 1968, Ser. No. 704,114
Int. Cl. F27b 7/08
U.S. Cl. 263—34                            3 Claims

ABSTRACT OF THE DISCLOSURE

This disclosure teaches an improved kiln for drying granular or powdered solids by means of indirect heat exchange with hot gases while recovering volatile material expelled from the solids. An inclined rotary kiln is fashioned in a shell-and-tube form. The hot gases are conducted through the shell side while the solid to be dried is caused by gravity to gradually course through the tubes.

BACKGROUND OF THE INVENTION

This disclosure relates to contacting granular or powdered solids for drying or the like by means of indirect heat exchange relationship with a hot gas. More particularly the invention resides in an apparatus especially suited to this task.

In the case of material in powdered form, such an operation could be carried out in a fluidized bed, but where large tonnages come into play, unmanageable amounts of moisture and other factors render the fluidized bed approach impractical.

The use of conventional rotary kilns presents problems because of the difficulty of providing sufficient heat transfer surface, and the difficulty and high cost in providing indirect heating for the single rotary kiln shell.

SUMMARY OF THE INVENTION

Applicant copes with this problem in a novel and facile way. An inclined rotary kiln is fashioned in a shell-and-tube form. Hot gas is conducted through the shell side while the powdered or granular solid to be dried is caused by gravity to roll gradually through the tubes. The tube side is vented for removal of volatile material expelled from the solid.

Basically this teaching offers improved drying of granular or powdered solids or convenient removal of volatile material. Contamination of the volatile material by the hot gas is obviated. Dust removal from the heating gas is unnecessary. Heat fluxes through the kiln material are made more uniform so that thermal distortions are reduced and the life of the structure is extended.

When solids in granular form are to be devolatized, there is an added benefit. The granules roll over heat transfer surface of the tubes and thereby develop a self cleansing effect. This rolling action also tends toward bulking the overall granular aggregation thereby enlarging voids for improved removal of the volatile material.

In addition to the foregoing, another advantage of treating solids in an apparatus as here disclosed is the contact of the particles in a relatively shallow bed with the heating surface, viz., the tubes of the kiln. Although in a conventional, externally-heated kiln the particles in the bed also cascade so as to contact the heating surface intermittently, due to the multiplicity of smaller diameter tubes described in the invention, this action is improved, resulting in better and more uniform heat transfer. In the case of granular solids, such as pellets or agglomerates, an additional benefit is the use of a much shallower bed depth, resulting in reduced attrition of the particles.

DESCRIPTION OF DRAWINGS

The foregoing and other features will appear more fully from the accompanying drawing wherein:

FIGURE I is a somewhat idealized sectional longitudinal elevation view of an apparatus according to the invention and taken along line I—I of FIGURE II.

FIGURE II is a transverse sectional elevation view taken along line II—II of FIGURE I.

DESCRIPTION OF PREFERRED EMBODIMENT

In the drawing cylindrical housing 1 is mounted for rotation about inclined axis 2 by supporting devices well known in industry and not here more fully elaborated upon. Upper tube sheet 3 and lower tube sheet 4 are spaced along axis 2 and cooperate with upper end 6 and lower end 7 respectively to define feeding chamber 8 and removal chamber 9. A motor is organized to drive girth gear 1'0. Relative the tube sheets, tubes 11 are peripherally spaced to define a generally circular configuration thereon.

It is desired to course the granular or powdered solid to be dried through tubes 11. Conduit 12 is connected to a feeding mechanism (of known design and not here further described) to introduce the solid material into feeding chamber 8. To feed tubes 11, feeding chamber 8 is formed symmetrically about axis so that as the kiln rotates a supply of solids remains in lower portion 13 thereof. When tubes 11 reach lower portion 13, solids flow by gravity into those tubes. As the tubes progress in the revolution of the kiln the solid finds its way through the tube and exits under gravity into removal chamber 9. Solids gather in removal chamber 9 and exit via conduit 14 by means of mechanisms well known in industry (and not here further described).

The solid is subjected to indirect heat exchange relationship with a hot gas conducted through the housing outside of tubes 11 (the so called "shell side"). For convenient sealing hot gas inlet 16 and hot gas outlet 17 are axially mounted. Extended surface could be provided on the tubes, particularly toward feeding chamber 8. Also baffles could be furnished on the shell side to influence velocity and flow distribution of the hot gases.

Volatile materials expelled from the solid can be collected without contacting the hot gas. Vent 18 is connected in flow series with feeding chamber 8 (on the so called "tube side") of the kiln. The bulk of the heat transfer is from hot gas (which traverses the shell side from inlet 16 to outlet 17) to granules rolling down through tubes 11. It should be understood that either counter-current or co-current heat transfer conditions can be maintained depending upon the direction of flow of the hot gases.

Although not shown in the drawing, provision generally would have to be made for differential expansion of the tubes, which could amount to several inches in the case of a long kiln. Expansion may be accommodated by providing a bellows in the circumference of feeding chamber 8 or by allowing tubes 11 to slide through openings in lower tube sheet 4.

This apparatus and related process are particularly well applied to drying taconite fines and for coking volatile-containing granules or agglomerates to recover volatiles therefrom. In both cases (drying and coking) indirect heat exchange is advantageous. In the case of coking, the volatiles can be withdrawn as a separate stream without admixture in the hot gases; in the case of drying powders, indirect heat is preferred so that the moisture leaves wihout mixing in the hot gas, thus reducing the dust-carry-over recovery problem. Also in the case of coking, the granular material rolls over the heat transfer surface which is most likely to suffer from deposition of high boiling materials or from the deposition of coke, thereby permitting a self cleansing action.

It will be understood by those familiar with heat transfer as well as those familiar with the design of process plant equipment that wide deviations may be made from that shown embodiment without departing from the theme of invention.

What is claimed is:
1. A kiln for devolatilizing solids and comprising:
   a substantially cylindrical housing arranged for rotation about its axis and inclined to define an upper end and a lower end,
   a pair of axially spaced tube sheets in the housing, one cooperating with the upper end to define a feeding chamber and the other cooperating with the lower end to define a removal chamber,
   feed means for introducing the solid material into the feeding chamber,
   at least two parallel tubes substantially circular in cross-section, connected between the tube sheets in sealed relationship about one of the holes in both tube sheets, so as to permit passage of the solid material from the feeding chamber to the removal chamber,
   means for discharging solid material from the removal chamber,
   heating means isolated from the feeding and removal chambers for conducting a heating medium previously heated outside the kiln, outside the tubes in the housing for indirect heat exchange with the solid,
   said heating means including inlet and outlet ducts arranged axially relative to the kiln, and
   vent means isolated from flow communication with the heating means and arranged for flow communication with the tubes via the feeding chamber, for exhausting vapor from within the tubes.
2. The kiln of claim 1 having each of the tube sheets defining at least three holes arranged to describe a generally circular configuration, and having at least three tubes.
3. The kiln of claim 2 having:
   the feeding chamber symmetrical about the axis of the housing whereby as the kiln rotates, a supply of the solid remains in a lower portion thereof,
   each of the tubes adapted to receive the solid by gravity flow from within the lower portion of the feeding chamber.

References Cited

UNITED STATES PATENTS

| | | | |
|---|---|---|---|
| 712,258 | 10/1902 | Campbell | 263—34 X |
| 2,026,441 | 12/1935 | Schafter et al. | |
| 2,165,128 | 7/1939 | Cheesman | 263—34 X |
| 2,413,933 | 1/1947 | Van Doorninck | 263—34 |

JOHN J. CAMBY, Primary Examiner